(12) United States Patent
Lefebvre et al.

(10) Patent No.: US 11,499,447 B2
(45) Date of Patent: Nov. 15, 2022

(54) BEARING SUPPORT WITH FRANGIBLE TABS

(71) Applicant: PRATT & WHITNEY CANADA CORP., Longueuil (CA)

(72) Inventors: Guy Lefebvre, St-Bruno-de-Montarville (CA); François Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 245 days.

(21) Appl. No.: 16/743,520

(22) Filed: Jan. 15, 2020

(65) Prior Publication Data

US 2021/0215066 A1 Jul. 15, 2021

(51) Int. Cl.
| | |
|---|---|
| *F01D 25/16* | (2006.01) |
| *F16C 19/26* | (2006.01) |
| *F16C 33/58* | (2006.01) |
| *F16C 35/04* | (2006.01) |
| *F16C 35/077* | (2006.01) |

(52) U.S. Cl.
CPC ............ *F01D 25/162* (2013.01); *F16C 19/26* (2013.01); *F16C 33/58* (2013.01); *F16C 35/042* (2013.01); *F16C 35/077* (2013.01); *F16C 2360/23* (2013.01)

(58) Field of Classification Search
CPC ........ F01D 25/16; F01D 25/162; F16C 19/26; F16C 33/58; F16C 35/042; F16C 35/077; F16C 2360/23; F05D 2240/50
See application file for complete search history.

(56) References Cited

U.S. PATENT DOCUMENTS

| | | | |
|---|---|---|---|
| 6,109,022 A * | 8/2000 | Allen | F01D 5/025 60/223 |
| 6,447,248 B1 | 9/2002 | Kastl et al. | |
| 7,097,413 B2 | 8/2006 | VanDuyn | |
| 7,909,514 B2 * | 3/2011 | Plona | F01D 25/162 384/499 |
| 10,196,934 B2 | 2/2019 | Khan et al. | |
| 2007/0081852 A1 * | 4/2007 | Bouchy | F16P 5/005 403/2 |
| 2007/0241257 A1 * | 10/2007 | Eleftheriou | F02C 7/20 248/554 |
| 2010/0135770 A1 * | 6/2010 | Durocher | F01D 25/28 415/69 |
| 2013/0163911 A1 * | 6/2013 | Antunes | F01D 25/166 384/498 |
| 2018/0355802 A1 * | 12/2018 | Sheridan | F01D 5/026 |

* cited by examiner

*Primary Examiner* — Eldon T Brockman
*Assistant Examiner* — Elton K Wong
(74) *Attorney, Agent, or Firm* — Norton Rose Fulbright Canada LLP.

(57) ABSTRACT

A gas turbine engine has: an engine shaft rotatable about a rotation axis; at least two bearings spaced apart from one another along the rotation axis, the at least two bearings having inner races for rotation with the engine shaft, outer races, and rolling elements disposed radially between the inner races and the outer races; a bearing support extending axially along the rotation axis from one of the at least two bearings to the other, the bearing support secured to both of the outer races of the at least two bearings, the bearing support secured to a structural case of the gas turbine engine via frangible tabs.

13 Claims, 3 Drawing Sheets

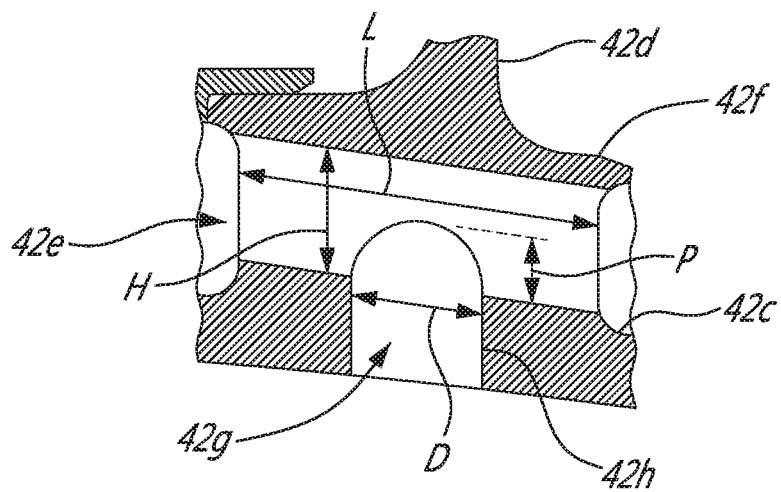
_FIG. 5_
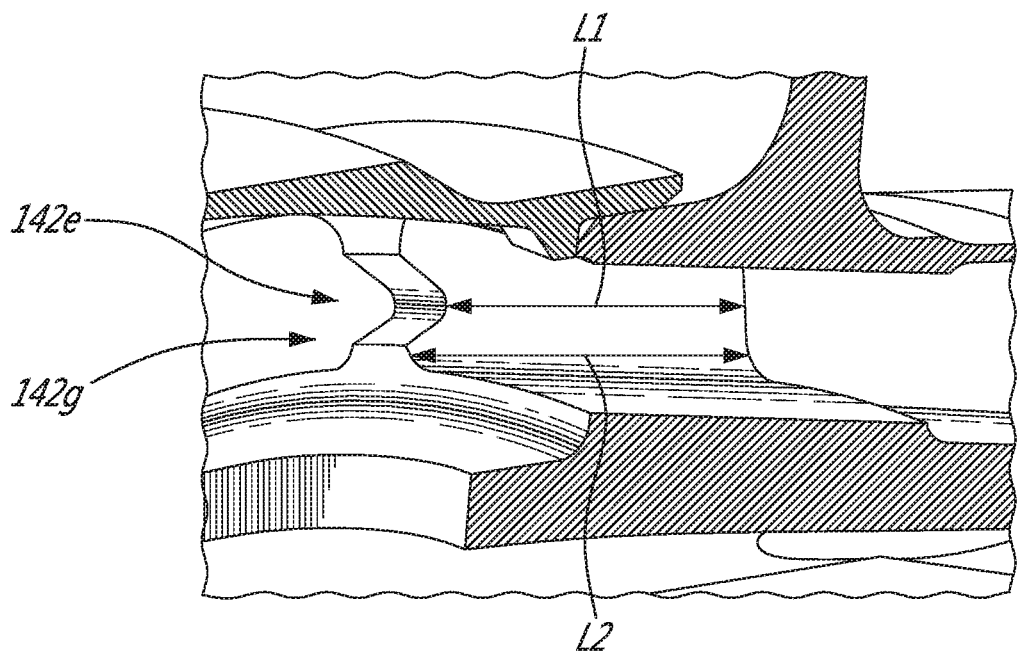
_FIG. 6_

BEARING SUPPORT WITH FRANGIBLE TABS

TECHNICAL FIELD

The application relates generally to gas turbine engines and, more particularly, to case assemblies comprising bearings for supporting shafts used in such engines.

BACKGROUND OF THE ART

In a gas turbine engine, a rotary shaft holding compressor/fan and turbine blades is rotatably mounted within a casing via bearings. The bearings are typically located radially inwards relative to the annular flow path formed by duct walls of the casing. A bearing housing usually encloses the bearings and defines a bearing cavity for receiving lubricant for lubricating the bearings. Due to the forces inherent to gas turbine engine operation, and as they are the interface between shafts and a support structure, the bearings are exposed to loads, vibrations, etc.

SUMMARY

In one aspect, there is provided a gas turbine engine comprising: an engine shaft rotatable about a rotation axis; at least two bearings spaced apart from one another along the rotation axis, the at least two bearings having inner races for rotation with the engine shaft, outer races, and rolling elements disposed radially between the inner races and the outer races; a bearing support extending axially along the rotation axis from one of the at least two bearings to the other, the bearing support secured to both of the outer races of the at least two bearings, the bearing support secured to a structural case of the gas turbine engine via frangible tabs.

In another aspect, there is provided a bearing support for a gas turbine engine, comprising at least two support members circumferentially extending about a rotation axis of the bearing support, each of the at least two support members configured to be coupled to a respective one of at least two bearings, the at least two support members secured to one another via a web, an annular flange secured to the web and configured to be secured to a case of the gas turbine engine, the web of the bearing support secured to the annular flange via frangible tabs circumferentially distributed about the rotation axis, the frangible tabs defining stress concentrators calibrated for rupturing upon at least one of the bearing supports subjected to a load exceeding a load threshold.

In yet another aspect, there is provided a method of decoupling outer races of at least two bearings rotatably supporting a shaft of a gas turbine engine, comprising: supporting the outer races of the at least two bearings with a bearing support secured to both of the outer races; transmitting a load from the outer races to a structural casing of a gas turbine engine via frangible tabs of the bearing support; and upon the load exceeding a load threshold, decoupling the outer races of the at least two bearings by rupturing the frangible tabs of the bearing support.

DESCRIPTION OF THE DRAWINGS

Reference is now made to the accompanying figures in which:

FIG. 5 is an enlarged view of a portion of FIG. 4 showing frangible tabs in accordance with one embodiment; and FIG. 6 is an enlarged view of a portion of FIG. 3 showing frangible tabs in accordance with another embodiment.

DETAILED DESCRIPTION

Figure 1:
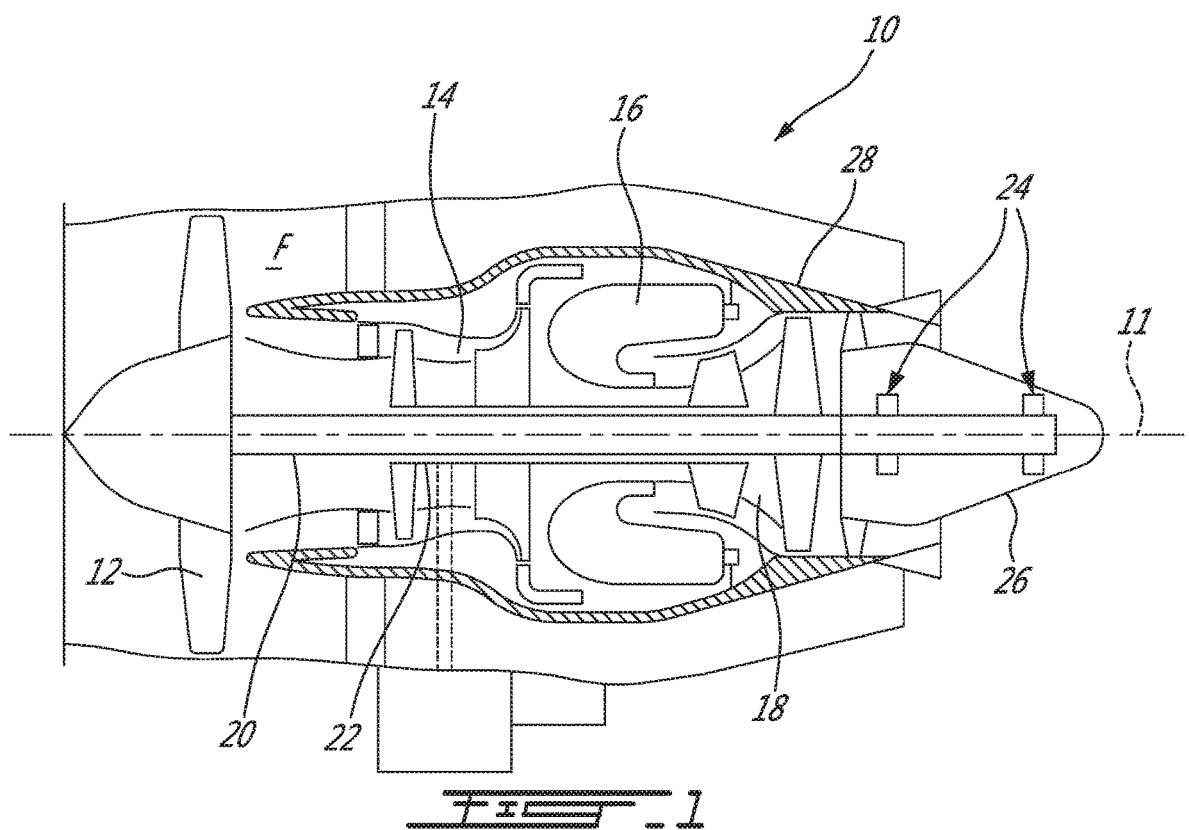
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central, or rotation, axis 11.

The compressor section 14, fan 12 and turbine section 18 have rotating components which can be mounted on one or more shafts 20, 22, which, in this embodiment, rotate concentrically around the central axis 11, though concentric rotation is optional. Bearings 24 are used to provide smooth relative rotation between a shaft (20 or 22) and casings, which are non-rotating components, and/or between the two shafts 20, 22 which may rotate at different speeds.

Still referring to FIG. 1, the shafts 20, 22 of the gas turbine engine 10 correspond respectively to a low-pressure shaft 20 and a high-pressure shaft 22. As shown in FIG. 1, a rear end of the low-pressure shaft 20 is located within a dome 26. In the depicted embodiment, the rear end of the low-pressure shaft 20 is rotatably supported by two spaced-apart bearings 24, though there may be fewer or more, and may be at other locations. As will be described below, a case assembly 30 (FIG. 2) is configured to transmit loads from the low-pressure shaft 20 to a structural outer case 28 of the gas turbine engine 10. The structural outer case 28 circumferentially extends around the central axis 11 of the engine 10 and extends around a core flow path F of the gas turbine engine 10.

Figure 2:
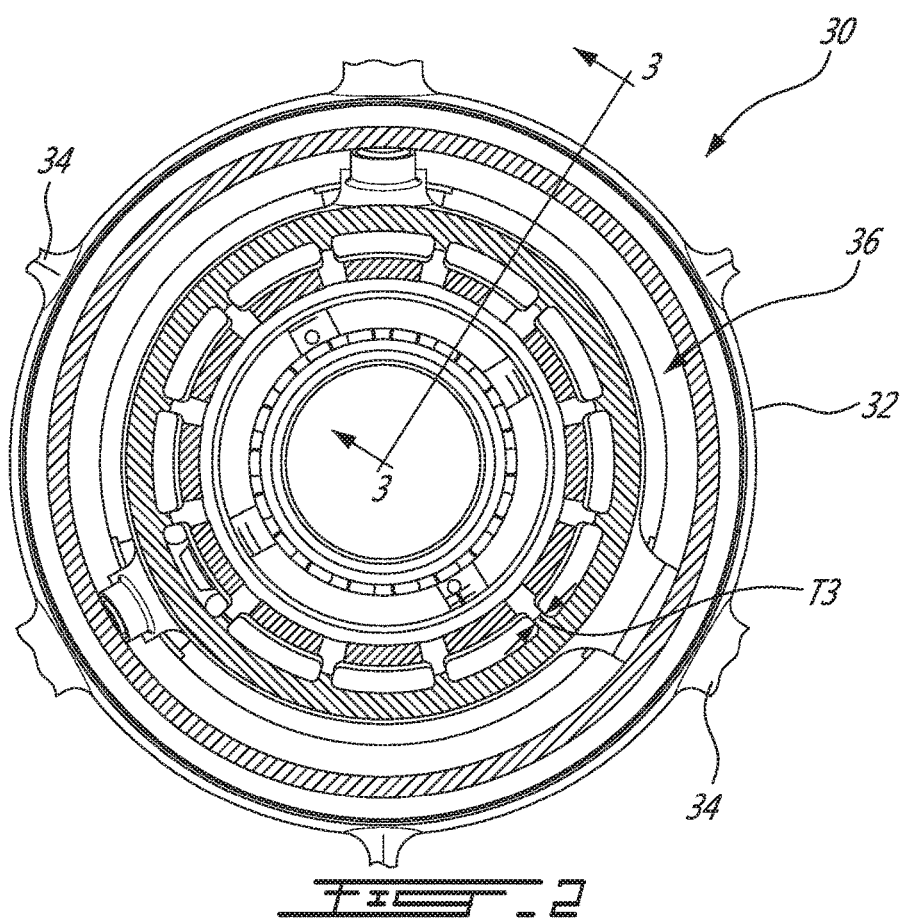
FIG. 2 is a schematic cross-sectional view of a case assembly of the gas turbine engine of FIG. 1, taken long line 2-2 on FIG. 3.
Figure 3:
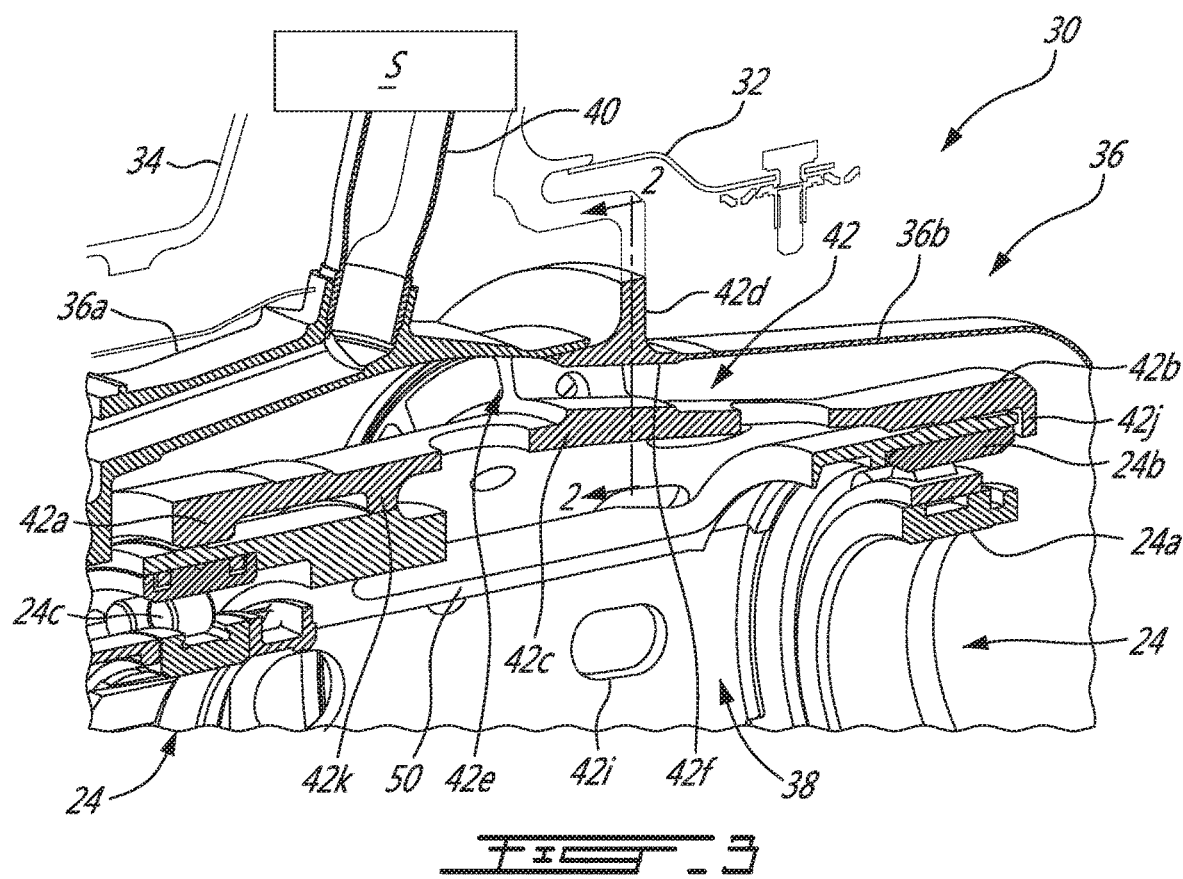
FIG. 3 is a schematic three dimensional cross-sectional view of the case assembly of FIG. 2 taken along line 3-3 on FIG. 2.

Referring to FIGS. 2-3, an inner case assembly is generally shown at 30. The inner case assembly 30 includes an inner case 32 which may define the dome 26 (FIG. 1). The inner case 32 is structurally connected to the outer structural case 28 via struts, such as a plurality of circumferentially distributed struts 34, and/or via other structural components. The inner case assembly 30 further includes a bearing housing 36. The bearing housing 36 defines a bearing cavity 38 (FIG. 2). The bearing cavity 38 contains the bearings 24.

During operation of the gas turbine engines, the bearings 34 may need to be lubricated. The bearing cavity 38 may therefore be fluidly connected to a lubrication system S of the gas turbine engine 10. Lubrication conduits 40 fluidly connect the lubrication system S to the bearing cavity 38. Those lubrication conduits 40 may extend within hollow portions of some of the structural struts 34, as one possible configuration among others. In the embodiment shown, one of the structural struts 34 receives therein a lubrication conduit 40 used for directing lubricant in the bearing cavity 38, another one of the struts 34 receives a scavenge conduit for directing lubricant from the bearing cavity 38 back to a lubricant reservoir of the lubrication system S, and another one of the struts 34 receives an air conduit for pressurizing an environment outside the bearing cavity 38 for limiting lubricant leaks. The air conduit may be fluidly connected to a source of pressurized air, such as the compressor section 14 (FIG. 1) of the engine 10 (FIG. 1).

Figure 4:
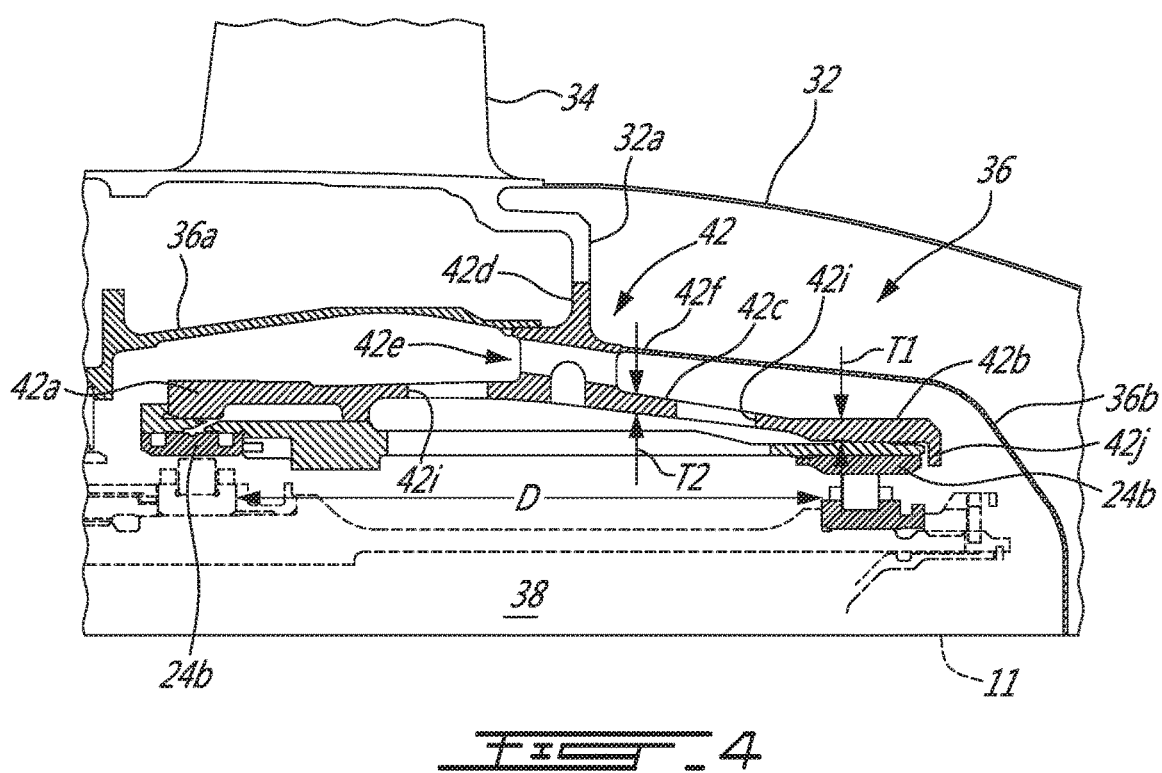
FIG. 4 is a schematic cross-sectional view of the case assembly of FIG. 2 taken along line 3-3 on FIG. 2.

Referring more particularly to FIGS. 3 and 4, as shown, the bearings 24 include inner races 24a, outer races 24b and rolling elements 24c, such as cylindrical rollers or balls, located radially between the inner and outer races 24a, 24b. The inner races 24a of the bearings 24 are secured to the low-pressure shaft 20 for rotation therewith. The outer races 24b are connected to a structural part of the structural outer case 28 of the engine 10. As described below, the outer races 24b of the bearings 24 are connected to the outer structural case 28 via a bearing support 42 and via the structural struts 34.

The bearing support 42 extends axially relative to the central axis 11 from one of the two bearings 24 to the other and may extend circumferentially all around the central axis 11. In the embodiment shown, the bearing support 42 is secured to both of the outer races 24b of the two bearings 24. The bearing support 42 may be configured to transmit loads received from the low-pressure shaft 20 and from the bearings 24 to the structural outer case 28. In other words, the bearing support 42 provides structural stiffness for supporting the low-pressure shaft 20.

The bearing support 42 for the low-pressure shaft 20 may need a safety feature in case of bearing seizure or excessive loads applied on the bearings 24. In this case, the low-pressure shaft 20 is supported by the two bearings 24 in the same bearing cavity 38, and the available space may be restrained. The usual frangible design uses a bolted flange as the frangible location in case of high stresses, the bolts acting as the fuses. This concept may not be used in some cases as the bolted flange may have required to have threaded service tubes going through the inner case instead of brazed ones, which would have require to have larger struts in the gaspath that would have adversely affected the engine performance. More specifically, in a conventional bolted flange design, the service tubes may need to be threaded in the bearing housing to allow for the complete disassembly of the bearing housing. Threaded tubes may be larger in diameter than brazed ones and therefore may require larger struts. These larger struts may reduce the total open area in the gaspath, which may reduce the engine performance. Moreover, in some cases, the limited space in the bearing cavity 38 may not allow the installation of bolts.

As aforementioned, in some cases, it may be required to decouple the outer races 24b of the two bearings 24 from the inner case 32. For instance, it may be required to decouple the outer races 24b when a phenomenon referred to as a bearing seizure may happen and/or when excessive loads are applied on the bearings 24. A bearing seizure may happen, for instance, if the lubrication system S becomes inoperative. In such a case, this may result in the inner race 24a of one of the bearings 24 being seized with its outer race 24b resulting in rotational torque provided by the low-pressure shaft 20 being transmitted to the outer race 24b of the one of the bearings 24 and to the outer race 24b of the other of the bearings 24 via the bearing support 42.

The bearing support 42 may be designed to break when a load exerted on it exceeds a predetermined threshold. The bearing support 42 includes two support members 42a and 42b. Each of the two supports members 42a, 42b is connected to a respective one of the outer races 24b of the two bearings 24. The two support members 42a, 42b of the bearing support 42 are connected to one another via a web 42c of the bearing support 42. In an embodiment, the support members 42a, 42b and the web 42c are a monolithic member—of a same material, but may also be a combination of interconnected members in another embodiment—e.g., of materials with different characteristics. The web 42c of the bearing support 42 spans a distance D (FIG. 4) between the outer races 24b of the bearings 24. The support members 42a, 42b of the bearing support 42 may have a stiffness greater than that of the web 42c. In the embodiment shown, a thickness T1 of the support member 42b taken in a radial direction relative to the central axis 11 may be greater than a thickness T2 of the web 42c. A ratio of the radial thickness T1 of the support members 42a, 42b to the distance D between the outer races 24c of the bearing 24 may be selected in function of loads applied on the bearings and the stiffness requirement.

Still referring to FIGS. 3 and 4, the bearing support 42 has an annular flange 42d that may circumferentially extend all around the central axis 11. The annular flange 42d is configured to be secured to an annular flange 32a of the inner case 32. The annular flange 32a of the inner case 32 may be welded to the annular flange 42d of the bearing support 42. In other words, the annular flange 42d of the bearing support 42 may be welded to a structural component of the gas turbine engine 10.

To allow the bearing support 42 to decouple the outer races 24b of the bearings 24 from the inner case 32, the bearing support 42 may include frangible tabs 42e. The frangible tabs 42e may be distributed circumferentially all around the central axis 11. There are a plurality of discrete and separated frangible tabs 42e, with circumferential gaps between them. The frangible tabs 42e may be equidistantly distributed about the central axis 11. In the embodiment shown, the frangible tabs 42e protrude radially outwardly relative to the central axis 11 from the web 42c of the bearing support 42. The frangible tabs 42e may be located axially between the bearing support members 42a, 42b of the bearing support 42. The frangible tabs 42e may be located halfway between the bearings 24. In a particular embodiment, the tabs 42e are axially aligned with one of the bearings.

In the depicted embodiment, the frangible tabs 42e are located within the bearing cavity 38 of the bearing housing 36. In the embodiment shown, the bearing housing 36 includes a fore section 36a and an aft section 36b, both may circumferentially extend all around the central axis 11. The bearing support 42 includes an annular wall section 42f that may be located axially between the fore and aft sections 36a, 36b of the bearing housing 36 relative to the central axis 11. More specifically and in the embodiment shown, the fore and aft sections 36a, 36b of the bearing housing 36 may be bridged via the wall section 42f of the bearing support 42. As shown in FIG. 4, each of the fore and aft sections 36a, 36b of the bearing housing 36 has an axial end in abutment with the wall section 42f of the bearing support 42. The frangible tabs 42e may be located radially between the web 42c of the bearing support 42 and the wall section 42f relative to the central axis 11. In such a case, the frangible tabs 42e are located inside the bearing cavity 38. In such a case, even upon rupture of the frangible tabs 42e, the bearing cavity 38 of the bearing housing 36 may remain substantially isolated from the environment outside the bearing cavity 38 since the tabs 42e are located radially inwardly of the annular wall section 42f of the bearing support 42 and radially inwardly of the bearing housing 36 relative to the central axis 11. In other words, the rupture of the tabs 42*e* may not affect the bearing housing 36. The frangible tabs 42*e* may be a monolithic part of the bearing support 42 in an embodiment. Hence, even though they may be of the same material as the bearing support 42, they may be the first component to break, i.e., be frangible, as they represent a discontinuity in the annular support structure of the bearing support 42. The expression "frangible" may therefore be related to the tabs 42*e* capacity to break or rupture while a remainder of the structure they are part of does not break or rupture in similar manner. The tabs 42*e* may be said to be frangible as they form a weakness, or weaker resistant to torque than other parts of the bearing support 42.

Referring now to FIGS. 2 and 5, the frangible tabs 42*e* may have a length L (FIG. 5) taken in an axial direction relative to the central axis 11 and a thickness T3 (FIG. 2) taken in a circumferential direction relative to the central axis 11. A ratio of the length L to the thickness T3 may be determined in function of loads applied on the bearings and stiffness requirements. The frangible tabs 42*e* have a height H (FIG. 5) taken in a radial direction relative to the central axis 11. A ratio of the thickness T3 to the height H may be determined in function of loads applied on the bearings and stiffness requirements.

Referring to FIG. 5, the frangible tabs 42*e* may include stress concentrators 42*g*, as an option. The stress concentrators 42*g* are configured to create a weakness section in the frangible tabs 42*e* so that the frangible tabs 42*e* are able to break upon the load exerted by the low-pressure shaft 20 exceeding a load threshold. In the embodiment shown, the stress concentrators 42*g* are apertures 42*h* extending through the web 42*c*, in a substantially radial direction relative to the central axis 11, of the bearing support 42 and ending between radially inner and outer ends of the frangible tabs 42*e*. A diameter D of the apertures 42*h* may be greater than the thickness T3 of the frangible tabs 42*e*. A ratio of the length L of the frangible tabs 42*e* to the diameter D of the apertures 42*h* through the web 42*c* may be determined in function of loads applied on the bearings and stiffness requirements. A ratio of the thickness T3 of the frangible tabs 42*e* to the diameter D of the apertures 42*h* may be determined in function of loads applied on the bearings and stiffness requirements. The apertures 42*g* may extend a predetermined depth P from the web 42*c*. A range of a ratio of the height H of the tabs 42*e* to the depth P of the apertures 42*g* may be determined in function of loads applied on the bearings and stiffness requirements.

Referring back to FIGS. 3-4, the bearing support 42 may define a plurality of apertures 42*i* that may be circumferentially distributed around the central axis 11 and disposed axially on both sides of the frangible tabs 42*e* and extending through the web 42*c*. Those apertures 42*i* may have an oblong shape, but any suitable shape may be used. Those apertures 42*i* may allow lubricant to circulate through the bearing support 42. The bearing support 42 may further define a radial protrusion 42*j* at an aft end thereof. The radial protrusion 42*j* extends radially inwardly toward the central axis 11 and may be configured to define a shoulder to limit axial displacement of the outer race 24*b* of an aft one of the bearings 24.

In the embodiment shown, an intermediate member 50 is located radially between the bearing support 42 and the outer races 24*b* of the bearings 24. The radial protrusion 42*j* is configured to be in abutment against an axial end of the intermediate member 50 and the outer race 24*b* of an aft-most of the bearings 24. It is understood that the intermediate member 50 may be absent and that the outer races 24*b* of the bearings 24 are in abutment against the bearing support 42. In the embodiment shown, the bearing support defines an intermediate radial protrusion 42*k* (FIG. 3) that protrudes radially inwardly of the web 42*c* and that may be in abutment against the intermediate member 50. The intermediate radial protrusion 42*k* may be located axially between the forward-most one of the support members 42*a*, 42*b* and the frangible tabs 42*e*.

Referring now to FIG. 6, another embodiment of the frangible tabs is generally shown at 142*e*. In the embodiment shown, the stress concentrators 142*g* correspond to a section of the tabs 142*e* defining a local decrease in the length of the frangible tabs 142*e*. In the embodiment shown, a length L1 of the frangible tabs 142*e* at the stress concentrators 142*g* is less than the length L2 of the frangible tabs 142*e* elsewhere. A ratio of the length L1 to the length L2 may be determined in function of loads applied on the bearings and stiffness requirements.

It is understood that although the depicted stress concentrators are provided in a form of either an aperture, or a local decreased length in the frangible tabs, any other suitable way of locally decreasing the stiffness of the tabs may be used. For instance, the frangible tabs may have a region of decreased thickness or any combination of a decreased thickness, a decreased length, and/or an aperture. In other words, the stress concentrators may be a section of a frangible tab that has a dimension taken in a control direction that is less than that of a remainder of the tabs. In other words, at least one of the stress concentrators is a section of a corresponding one of the frangible tabs defining a local decrease in a dimension taken in a control direction. The control direction may be any one of a radial direction, a circumferential direction or an axial direction relative to the central axis. In other words, the stress concentrators may be created by any one of the followings, taken individually or in any combination: local decreased thickness; local decreased length; local decreased height; aperture(s); grooves; and so on.

There is described herein a mechanical arrangement to support the two bearings 24 on a single welded flange 42*d* and featuring a frangible location 42*e*, contained within a restrained bearing cavity 38. Instead of using bolts as the fuses, this concept includes frangible tabs 42*e*, which may be more compact than bolts and may reduce the overall parts count. The two support members 42*a*, 42*b* may have calibrated stiffness. The bearing support 42 has a frangible location comprising frangible tabs 42*e* and stress concentrators 42*g*, contained within the oil cavity 38. The stress concentrator 42*g*, which may be holes, may allow the calibrated frangible tabs 42*e* to fail under tangential loads, in case of bearing seizure, or excessive radial loads. The frangible tabs 42*e* may preserve the structural integrity of the service tubes 40 and other components outside the bearing cavity 38.

The fuse load of the frangible tabs may be calibrated by thickening or thinning the tabs 42*e* and changing the stress concentrator holes 42*h* diameter D and depth P. The stiffness of the support members 42*a*, 42*b* may be calibrated by changing the axial length L of the tabs 42*e* and the thickness T1 of the support members 42*a*, 42*b*. The annular flange 42*d* axial position may balance the stiffness between support members 42*a*, 42*b*. More specifically, the stiffness requirements for each bearings may be the same or different. Biasing the member 42*d* toward one of the bearings or the other may allow to increase the stiffness on one side while decreasing the stiffness on the other.

The current embodiment depicts a frangible arrangement, which may include twelve frangible tabs 42e, which may be equally spaced, and twelve stress concentrator apertures. It is understood that the number of tabs 42e and stress concentrators 42g could vary to accommodate other stiffness and ultimate loads requirements. The stress concentrators 42g may be on one or both ends of the tabs instead of being in the middle.

Frangible tabs 42e may provide a safety feature in case of bearing seizure or excessive loads on the bearing supports 42a, 42b. The design disclosed herein may be more compact than other configurations using frangible bolts. The disclosed bearing support 42 may be easily fine tunable and may allow two bearing support 42a, 42b to be contained in one restrained bearing cavity 38 to have their own stiffness and safety feature.

For decoupling the outer races 24b of the at least two bearings 24; a load is transmitted from the outer races 24b to the structural casing 32 via the frangible tabs 42e of the bearing support 42; and upon the load exceeding a load threshold, the outer races 24b of the at least two bearings 24 are decoupled by rupturing the frangible tabs 42e of the bearing support 42. In the embodiment shown, rupturing the frangible tabs 42e includes breaking sections of the frangible tabs 42e defining local decreases in a dimension taken in a control direction. Transmitting the load may include transmitting the load via the annular flange 42d of the bearing support 42 being welded to the structural casing 32.

Embodiments disclosed herein include:

A. A gas turbine engine comprising: an engine shaft rotatable about a rotation axis; at least two bearings spaced apart from one another along the rotation axis, the at least two bearings having inner races for rotation with the engine shaft, outer races, and rolling elements disposed radially between the inner races and the outer races; a bearing support extending axially along the rotation axis from one of the at least two bearings to the other, the bearing support secured to both of the outer races of the at least two bearings, the bearing support secured to a structural case of the gas turbine engine via frangible tabs.

B. A bearing support for a gas turbine engine, comprising at least two support members circumferentially extending about a rotation axis of the bearing support, each of the at least two support members configured to be coupled to a respective one of at least two bearings, the at least two support members secured to one another via a web, an annular flange secured to the web and configured to be secured to a case of the gas turbine engine, the web of the bearing support secured to the annular flange via frangible tabs circumferentially distributed about the rotation axis, the frangible tabs defining stress concentrators calibrated for rupturing upon at least one of the bearing supports subjected to a load exceeding a load threshold.

Embodiments A and B may include any of the following elements, in any combinations:

Element 1: the bearing support include at least two support members secured to each other via a web spanning a distance between the at least two bearings, each of the at least two support members secured to a respective one of the outer races of the at least two bearings, a stiffness of the at least two support members greater than a stiffness of the web. Element 2: a bearing housing defining a bearing cavity therein, the at least two bearings and the frangible tabs located within the bearing cavity and radially inwardly of the bearing housing. Element 3: the frangible tabs protrudes radially outwardly from a web of the bearing support, the frangible tabs circumferentially distributed around the rotation axis. Element 4: the frangible tabs have stress concentrators. Element 5: at least one of the stress concentrators is an aperture defined through the frangible tabs. Element 6: at least one of the stress concentrators is a section of a corresponding one of the frangible tabs defining a local decrease in a dimension taken in a control direction. Element 7: the control direction is an axial direction relative to the rotation axis. Element 8: the bearing support has an annular flange radially outwardly of the frangible tabs, the annular flange welded to a case of the gas turbine engine. Element 9: the bearing housing includes a fore section and an aft section, the bearing support defining a wall section, the frangible tabs extending radially from a web of the bearing support to the wall section, the wall section of the bearing support in abutment with both of to the fore and aft sections of the bearing housing. Element 10: a stiffness of the at least two support members greater than a stiffness of the web. Element 11: at least one of the stress concentrators is a section of a corresponding one of the frangible tabs defining a local decrease in a dimension taken in a control direction. Element 12: the control direction is an axial direction relative to the central axis.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine comprising: an engine shaft rotatable about a rotation axis; at least two bearings spaced apart from one another along the rotation axis, the at least two bearings having inner races for rotation with the engine shaft, outer races, and rolling elements disposed radially between the inner races and the outer races; a bearing support extending axially along the rotation axis from one of the at least two bearings to the other, the bearing support secured to both of the outer races of the at least two bearings, the bearing support secured to a structural case of the gas turbine engine via frangible tabs.

2. The gas turbine engine of claim 1, wherein the bearing support include at least two support members secured to each other via a web spanning a distance between the at least two bearings, each of the at least two support members secured to a respective one of the outer races of the at least two bearings, a stiffness of the at least two support members beinq greater than a stiffness of the web.

3. The gas turbine engine of claim 1, having a bearing housing defining a bearing cavity therein, the at least two bearings and the frangible tabs located within the bearing cavity and radially inwardly of the bearing housing.

4. The gas turbine engine of claim 3, wherein the bearing housing includes a fore section and an aft section, the bearing support defining a wall section, the frangible tabs extending radially from a web of the bearing support to the wall section, the wall section of the bearing support in abutment with both of to the fore and aft sections of the bearing housing.

5. The gas turbine engine of claim 1, wherein the frangible tabs protrude radially outwardly from a web of the bearing support, the frangible tabs circumferentially distributed around the rotation axis.

6. The gas turbine engine of claim 1, wherein the frangible tabs have stress concentrators.

7. The gas turbine engine of claim 6, wherein at least one of the stress concentrators is an aperture defined through the frangible tabs.

8. The gas turbine engine of claim 6, wherein at least one of the stress concentrators is a section of a corresponding one of the frangible tabs defining a local decrease in a dimension taken in a control direction.

9. The bearing support of claim 8, wherein the control direction is an axial direction relative to the rotation axis.

10. The gas turbine engine of claim 1, wherein the bearing support has an annular flange radially outwardly of the frangible tabs, the annular flange welded to a case of the gas turbine engine.

11. A method of decoupling outer races of at least two bearings rotatably supporting a shaft of a gas turbine engine, comprising:
supporting the outer races of the at least two bearings with a bearing support secured to both of the outer races, the at least two bearings having inner races rollingly engaged to the outer races, the inner races rotating with the shaft;
transmitting a load from the outer races to a structural casing the gas turbine engine via frangible tabs of the bearing support; and
upon the load exceeding a load threshold, decoupling the outer races of the at least two bearings by rupturing the frangible tabs of the bearing support.

12. The method of claim 11, wherein rupturing the frangible tabs includes breaking sections of the frangible tabs defining local decreases in a dimension taken in a control direction.

13. The method of claim 11, wherein transmitting the load includes transmitting the load via an annular flange of the bearing support being welded to the structural casing.

* * * * *